Aug. 5, 1958  L. HOLMES, JR  2,845,800
GYROSCOPE UNIT AND INTERLOCKING MEANS
Filed March 23, 1953  2 Sheets-Sheet 1

LAWRENCE HOLMES, JR.,
INVENTOR.

BY
ATTORNEY

Aug. 5, 1958    L. HOLMES, JR    2,845,800
GYROSCOPE UNIT AND INTERLOCKING MEANS
Filed March 23, 1953    2 Sheets-Sheet 2
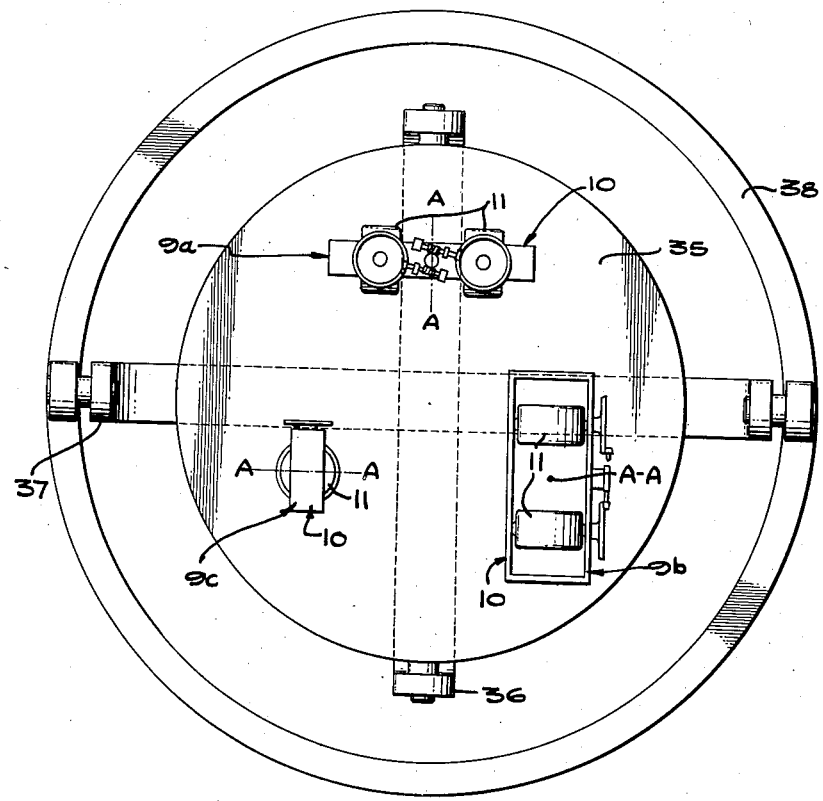
Fig. 3.
LAWRENCE HOLMES, JR.,
INVENTOR.
BY 
ATTORNEY United States Patent Office 2,845,800
Patented Aug. 5, 1958

2,845,800

GYROSCOPE UNIT AND INTERLOCKING MEANS

Lawrence Holmes, Jr., San Bernardino, Calif.

Application March 23, 1953, Serial No. 344,031

9 Claims. (Cl. 74—5.34)

My invention relates to gyroscopes in general, and relates in particular to a gyroscopic device which will hold its position with reference to the celestial sphere with greater approach to accuracy than has been heretofore obtained.

It is an object of the invention to accomplish the foregoing result by the incorporation in a gyroscopic device, in each of the three planes of the celestial sphere, a gyroscope unit of novel form having parts which cooperate to substantially prevent or minimize drift which in present gyroscopic devices of this general character, causes departure from true or original position with relation to the celestial sphere.

It is an object of the invention to provide a gyroscope unit in which movements of drift, as differentiated from precession, are compensated or prevented. It is a further object of the invention to provide a gyroscope unit having therein a pair of gyrostats associated for cooperative action whereby the effects of drift will be substantially eliminated. Herein I employ the term "gyrostat" to indicate a rotating mass such as a gyroscope wheel or rotor and the case in which it is supported for rotation. Furthermore, I employ the term "gyroscope" herein to mean the rotatable wheel or rotor itself, and the term "gyroscope unit" will be used to mean two gyroscopes in cooperative relation as hereinafter described.

A further object of the invention is to provide a gyroscope unit having a pair of gyrostats mounted in a gimbal, with means for correlating the rotation of the gyrostats in a manner to prevent either of them from movement except when both gyrostats of the unit precess, and then resulting rotation only to the same amount.

A further object of the invention is to provide a simple correlating or control means of the character referred to in the preceding paragraph comprising a pair of worm gears or screws which engage a single idler worm wheel, each of the worm gears being connected to one of the gyrostats so as to be powered by the precession of such gyrostat as the result of torque applied to the supporting gimbal and transmitted to the gyroscope in a direction perpendicular to the axis of rotation of the gyroscope. In this arrangement, neither worm gear can turn unless the other turns, the result being that the gyrostats are both locked in the gimbal unless both gyrostats have precession in the same direction on their axis of precession defined by the external pivots of the gyrostat cases.

A further object of the invention is to provide a gyroscope unit such as described herein, wherein one of the gyroscopes has faster but less forcible precession than the other of the gyroscopes, thereby avoiding any tendency for the correlating means of the gyroscope unit to lock. In this part of the invention, I utilize the normal functions of gyroscopes of equal weight and size running at different speeds, thereby developing different rates and forces of precession. A fast roating gyroscope precesses slowly but with greater force than the slow rotating gyroscope which precesses more rapidly but with lesser force. When precession of the gyroscopes in one direction occurs the more rapidly precessing gyroscope will take the lead and will be retarded in its precession by the slower precessor. Actually, the slower precessing but more powerful gyroscope acts as an escapement mechanism for the other. The same functions are utilized in the return precession, and any friction developed in the initial precession is cancelled on the return precession. The correlation of the gyrostats effects a condition that the only time the gyrostats are permitted to rotate on their axis is when forces are applied to the gimbal to cause a true precession of the gyroscopes, thus substantially eliminating the drift characteristics of conventional gyroscopes.

A further object of the invention is to provide a simple form of governor having utility in devices other than that disclosed herein.

Referring to the drawings which are for illustrative purposes only and wherein I have disclosed a preferred embodiment of the invention for the purpose of enabling others to practice the invention without limiting the scope of the claims.

Fig. 3 is schematic view showing the manner in which three gyroscope units are arranged in a single support to form a celestial gyroscopic platform.

Figure 1:
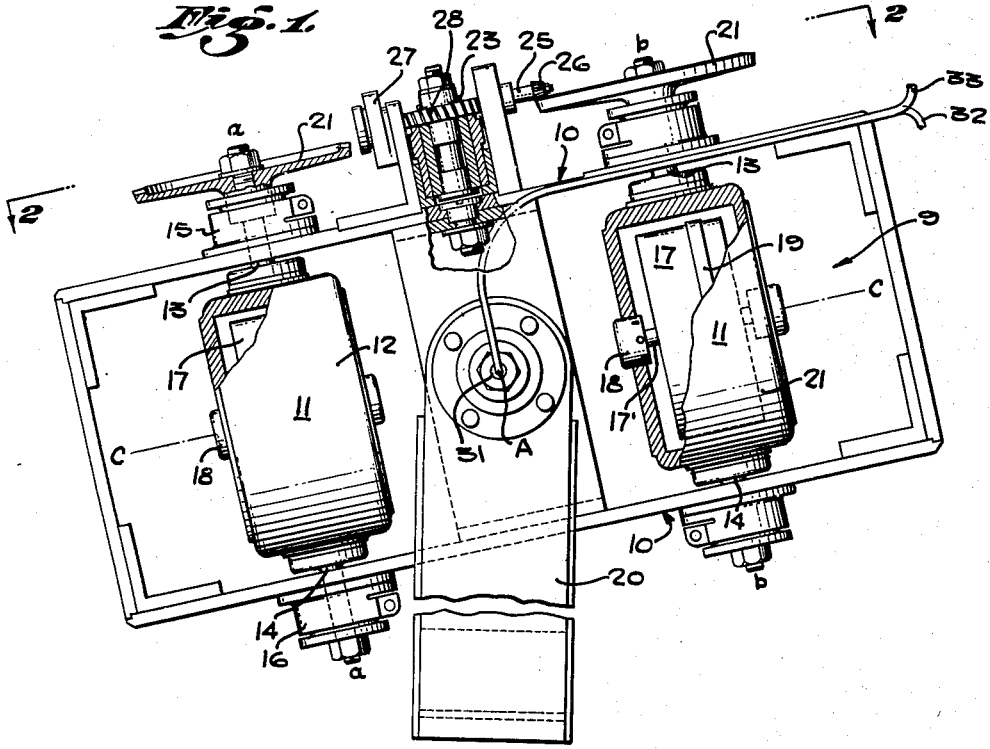
Fig. 1 is a diagrammatic view of a gyroscope unit wherein the parts entering into the combination are shown in their simplest form, it being understood that all of the refinements employed in high grade instrument construction will be employed.

In Fig. 1, I show a gimbal 10 of rectangular form having a pair of gyrostats 11 mounted therein on parallel axes $a$—$a$ and $b$—$b$ so as to form a gyroscope unit 9. Each of the gyrostats 11 includes a case 12 having projecting shafts 13 and 14 supported respectively by bearings 15 and 16 whereby the cases may be respectively rotated on the axes $a$—$a$ and $b$—$b$. In each of the cases 12 there is a gyroscope 17 supported by bearings 18 disposed respectively on axes which are perpendicular to the axes $a$—$a$ and $b$—$b$. Each gyroscope or rotor 17 has associated therewith driving motor means 19 of either electrical or air operated type.

The gyroscope unit 9 is supported by a yoke 20 so that it may rotate on an axis A—A disposed in a plane $c$—$c$ which is perpendicular to the axes $a$—$a$ and $b$—$b$. With the gyroscopes 17 rotating in the same direction, any torque applied to the gimbal 10 tending to rotate the gimbal 10 around the axis A—A, will be transmitted through the shafts 13 and 14 to the cases 12 of the gyrostats 11 and from the cases 12 to the shafts 17' of the gyroscopes 17. The torque, thus applied to the gyroscopes 17 will result in precession thereof in the same direction, which precession will be evidenced by rotation or precessional movement of the gyrostat cases 12 on their respective axes $a$—$a$ and $b$—$b$. As will be hereinafter explained, means are provided, responding to this precession of gyrostats 11 to apply a counter torque to gimbal 10 which will cause precession of the gyrostats in reverse direction, to return them to their initial positions.

Figure 2:
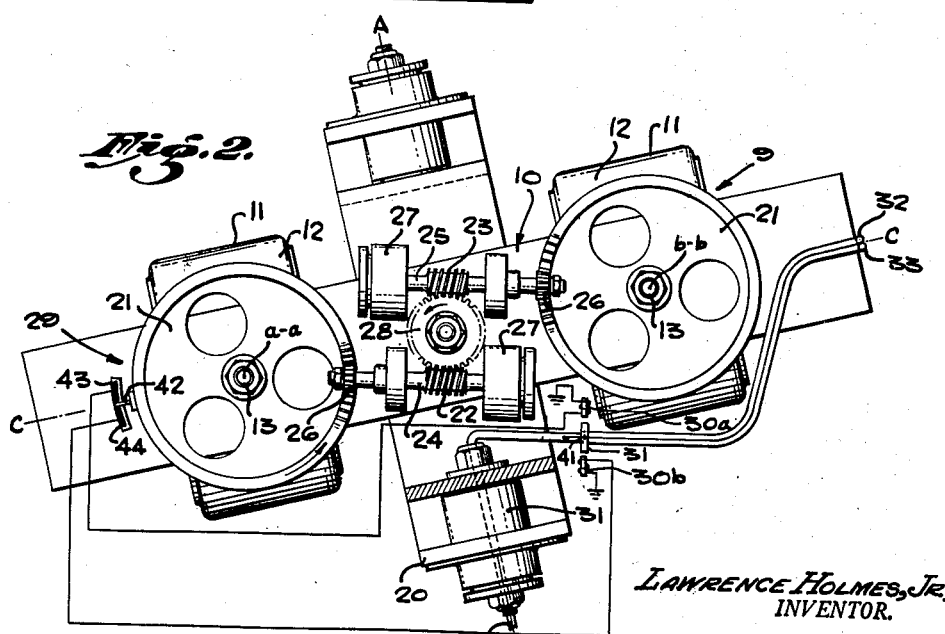
Fig. 2 is a top view of Fig. 1.

The invention includes a governor, which is of utility in other devices, but in the present device provides means for permitting precessional movement of the gyrostats 11 in the same direction, but locks the gyrostats 11 against contra-rotation. As shown in Figs. 1 and 2, each shaft 13 has a bevel gear 21 fixed thereon and these bevel gears 21 are interconnected by a gear means which will exercise the desired control over the rotation of the gyrostats 11 on the axes $a$—$a$ and $b$—$b$. Such gear means consists of worm screws 22 and 23 mounted respectively on shafts 24 and 25 having on the ends thereof gears 26 meshed with the bevel gears 21. The shafts 24 and 25 are supported by bearings 27 in such positions that the worm screws 22 and 23 carried thereby will engage a companion idler worm gear 28. The pitch of the threads of the worm screws 22 and 23 and the worm gear 28 is such that rotation of the idler gear 28 will not cause rotation of either the worm screw 22 or the worm screw 23. However, rotation of either screw 22 or 23 will impart a rotative force to the idler worm gear 28 and if both of the screws 22 and 23 are simultaneously rotated in opposite directions, the idler worm gear 28 will be rotated. Rotation of one of the worm gears 22 without rotation of the other worm gear in opposite direction, however, will result in a non-movement of the gear mechanism. For example, should the righthand gyrostat 11 tend to rotate due to gyrostat imbalance, or any other reason tending to cause gyroscope drift, rotative force will be imparted to the screw 23, but since the worm gear 28 cannot be rotated unless the screw 22 rotates, the righthand gyrostat is locked against independent rotation. This same explanation applies to the lefthand gyrostat 11. Also, the gyrostats 11 are locked against tendency to simultaneously contra-rotate. Therefore, a very small imbalance of the gyroscopes 17 may be intentionally incurred tending to cause contra-rotation of the gyrostats 11.

The invention includes a means for applying to the gimbal 10 a contra-torque around the axis A—A when an initial torque applied to the gimbal 10 has resulted in precession of the gyrostats. A pair of air tubes 32 and 33 as schematically shown in Figs. 1 and 2, are carried through one of the trunnions 31 by which the gyroscope unit is supported in a yoke 20. The ends of the tubes 32 and 33 are turned in opposite directions so that air issuing therefrom will apply reactive forces tending to rotate the gimbal 10 respectively in opposite directions around the axis A—A.

One of the bevel gears 21 is arranged to actuate a switch means 29 when precession of the gyrostats 11 occurs, whereby either an electromagnet 30a or an electromagnet 30b will be energized to actuate a valve means 31 and produce an imbalance of the airflow through the tubes 32 and 33 so that contra-torque will be applied to the gyroscope unit. As schematically shown in Fig. 2, compressed air, from any suitable source, is received through a tube 40. The valve member 31 has an aperture 41 which, when centralized, divides the air from the tube 40 equally between the tubes 32 and 33. The switch means 29 includes a grounded contact 42 which is moved from a centralized position when the gear 21 rotates as the result of gyrostat precession. Contacts 43 and 44 are arranged on opposite sides of the contact 42, and these contacts 43 and 44 are respectively connected in series with the electromagnets 30a and 30b. Accordingly, precession of the gyrostats 11 from their centralized positions will result in movement of the contact 42 into engagement with one or the other of the contacts 43 and 44, to energize the corresponding electromagnet 30a or 30b and actuate the valve means 31 so that there will be an unbalanced flow of air through the tubes 32 and 33 and consequently the application of a contra-torque to the gyroscope unit as the result of the discharge of air from one of the tubes 32 or 33. The contra-torque thereby applied will act upon the gyrostats 11 to effect contra-precession thereof which will result in movement of the contact 42 back into a centralized position between the contacts 43 and 44.

The combination shown in Figs. 1 and 2 may be used as a component of the sidereal clock. However, the invention likewise comprehends the arrangement disclosed in Fig. 3, having utility in a celestial gyroscope characterized by minimum drift. A gimbal plate 35 is schematically shown supported by gimbal rings 36, 37 and 38, for universal movements. The gimbal plate 35 comprises a platform which rigidly supports three of the gyroscope units 9, previously described herein, as specifically indicated at 9a, 9b and 9c, these gyroscope units being disposed so that the respective axes A—A will lie in three different planes. The gyroscope units are not movable relative to the plate. If an eccentric force is applied to the plate 35, torque will be applied tending to rotate at least one of the gyroscope units 9 around its axis A—A, and a precession of its interlocked gyrostats will take place in the manner explained with relation to Figs. 1 and 2. This precession of the gyrostats is utilized to control the application of contra-torque to the plate 35 to offset the initially applied torque.

I claim:

1. In a celestial gyroscopic platform: a gimbal member; a plurality of gimbal rings supporting said member; and at least three gyroscope units supported on said member so that their axes lie in different planes, each of said gyroscope units comprising a pair of gyrostats and interlocking means connecting said gyrostats, operating to allow precessional movement and inhibit drift movement of said gyrostats, said interlocking means comprising idler gear means, worm screws engaging said idler gear means, and means connecting said worm screws respectively with said gyrostats so that torque applied to said gyrostats will be transmitted to said worm screws.

2. In a gyroscopic device: a gimbal member; a pair of gyrostats rotatably supported by said member; a locking means for one of said gyrostats providing an unyieldable abutment to prevent rotation of said gyrostat, and thereby prevent drift movement of the gyrostat; and means responding to precessional movement of the second of said gyrostats to release said locking means whereupon said abutment may move to allow precession of the first gyrostat.

3. In a gyroscopic device: a gimbal member; a pair of gyrostats rotatably supported by said member; and interlocking means connecting said gyrostats, operating to allow precessional movement and inhibit drift movement of said gyrostats, said interlocking means comprising idler gear means, worm screws engaging said idler gear means, and means connecting said worm screws respectively with said gyrostats so that torque applied to said gyrostats will be transmitted to said worm screws.

4. In a gyroscopic device: a gimbal member; a pair of gyrostats rotatably supported by said member; and a linkage connecting said gyrostats adapted to allow precessional movement and inhibit drift movement of said gyrostats, said linkage comprising an abutment means for preventing rotation of one of said gyrostats, screw means to hold said abutment means immovable, and means operating in response to the rotation of the other of said gyrostats to rotate said screw means so as to change the position of said abutment and permit rotation of the first gyrostat.

5. In a gyroscopic device: a gimbal member; a pair of gyrostats rotatably supported by said member with their respective axes substantially parallel; and a linkage connecting said gyrostats adapted to allow precessional movement and inhibit drift movement of said gyrostats, said linkage comprising an abutment means for preventing rotation of one of said gyrostats, screw means to hold said abutment means immovable, and means operating in response to the rotation of the other of said gyrostats to rotate said screw means so as to change the position of said abutment and permit rotation of the first gyrostat.

6. In a gyroscopic device: a gimbal member; a pair of gyrostats rotatably supported by said member, said gyrostats having a small degree of imbalance in opposing relation; a locking means for one of said gyrostats providing an unyieldable abutment to prevent rotation of said gyrostat, and thereby prevent drift movement of the gyrostat; and means responding to precessional movement of the second of said gyrostats to release said locking means whereupon said abutment may move to allow precession of the first gyrostat.

7. A linkage for connecting two independent rotatably supported members, comprising: a worm gear means supported for rotation and a pair of independently drivable worm screws engaging companion gear teeth of said worm gear means, said worm screws having threads of such pitch that said worm gear cannot rotate said worm screws, so that they are locked against independent rotation, and the rotation of one of said worm screws permitting rotation of the other in correlated direction.

8. In a governor for a rotatably supported part: a worm gear means supported for rotation and a pair of worm screws supported so as to be driven from independent sources of power and engaging companion gear teeth of said worm gear means, there being means for preventing bodily movement of said worm gear means relative to said worm screws and the rotation of one of said worm screws permitting rotation of the other in correlated direction at a speed according to slowest rotating worm screw.

9. In a mechanism: a support, a pair of members rotatably carried by said support; and interlocking means between said members operating to allow simultaneous rotation of said members and prevent independent rotation thereof, said interlocking means comprising idler gear means, supported so as to rotate around an axis which is in fixed relation to said support worm screws engaging said idler gear means, and means connecting said worm screws respectively with said rotatable members to control the rotation thereof.

References Cited in the file of this patent

UNITED STATES PATENTS

| | | |
|---|---|---|
| 1,050,153 | Marmonier | Jan. 14, 1913 |
| 1,083,370 | Luyken | Jan. 6, 1914 |
| 1,112,997 | De Ferranti | Oct. 6, 1914 |
| 1,236,993 | Sperry et al. | Aug. 14, 1917 |
| 1,366,770 | Davis | Jan. 25, 1921 |
| 1,751,650 | Nieman | Mar. 25, 1930 |
| 2,223,246 | Coletti | Nov. 26, 1940 |
| 2,599,885 | Benua | June 10, 1952 |